United States Patent [19]
Mehrotra

[11] Patent Number: 5,822,790
[45] Date of Patent: Oct. 13, 1998

[54] VOTING DATA PREFETCH ENGINE

[75] Inventor: Sharad Mehrotra, Cupertino, Calif.

[73] Assignee: Sun Microsystems, Inc., Mountain View, Calif.

[21] Appl. No.: 797,105

[22] Filed: Feb. 7, 1997

[51] Int. Cl.[6] .................................................. G06F 9/38
[52] U.S. Cl. ..................... 711/213; 711/204; 395/383; 395/864; 326/11; 371/36
[58] Field of Search ................................. 711/100, 117, 711/118, 137, 1, 3, 119, 122, 213, 204; 395/381, 383, 856–865; 326/11; 371/36

[56] References Cited

U.S. PATENT DOCUMENTS

| | | | |
|---|---|---|---|
| 5,146,578 | 9/1992 | Zangenehpour | 395/425 |
| 5,261,066 | 11/1993 | Jouppi et al. | 395/425 |
| 5,285,527 | 2/1994 | Crick et al. | 395/425 |
| 5,287,487 | 2/1994 | Priem et al. | 395/425 |
| 5,305,389 | 4/1994 | Palmer | 382/305 |
| 5,313,634 | 5/1994 | Eickemeyer | 395/587 |
| 5,317,718 | 5/1994 | Jouppi | 395/425 |
| 5,357,618 | 10/1994 | Mirza et al. | 395/400 |
| 5,361,391 | 11/1994 | Westberg | 395/425 |
| 5,367,656 | 11/1994 | Ryan | 395/425 |
| 5,371,870 | 12/1994 | Goodwin et al. | 395/425 |
| 5,377,336 | 12/1994 | Eickemeyer et al. | 395/383 |
| 5,499,355 | 3/1996 | Krishnamohan et al. | 711/137 |
| 5,694,568 | 12/1997 | Harrison, III et al. | 711/213 |

OTHER PUBLICATIONS

Sharad Mehrotra, *Data Prefetch Mechanisms for Accelerating Symbolic and Numeric Computation*, Report No. UIUCDCS.R–96–1940 (1996), pp. 1–139.

Fredrik Dahlgren and Per Stenström, *Evaluation of Hardware–Based Stride and Sequential Prefetching in Shared–Memory Multiprocessors*, IEEE Transactions on Parallel and Distributed Systems, vol. 7, No. 4, Apr. 1996, pp. 385–398.

Fredrik Dahlgren, Michel Dubois, and Per Stenström, *Sequential Hardware Prefetching in Shared–Memory Multiprocessors*, IEEE Transactions on Parallel and Distributed Systems, vol. 6, No. 7, Jul. 1995, pp.733–746.

Tien–Fu Chen and Jean–Loup Baer, *Effective Hardware–Based Data Prefetching for High–Performance Processors*, IEEE Transactions on Computers, vol. 44, No. 5, May 1995, pp. 609–623.

Tolerating Latency Through Software–Controlled data Prefetching, Standford University CA, Todd C. Mowry, Ph.D. Thesis, pp. 1–6, Mar. 1994.

*Primary Examiner*—Tod R. Swann
*Assistant Examiner*—Mehdi Namazi
*Attorney, Agent, or Firm*—Skjerven, Morrill, MacPherson, Franklin & Friel, LLP; David W. O'Brien

[57] ABSTRACT

A voter provided in combination with a plurality of prefetch predictors provides improved prefetch performance. In one embodiment, the voter determines which of the prefetch predictors is making more accurate predictions, and uses predictions of the more effective prefetch predictor to prefetch data into a buffer for use in satisfying cache misses. A voting prefetch engine advantageously improves cache performance, and therefore processor performance, by reducing cache misses more than cache misses would be reduced by operation an individual prefetch predictor. Stride predictor-type and stream predictor-type prefetch predictors may be provided in combination with a prefetch buffer and voter to provide improved data cache performance in a high-performance processor.

40 Claims, 4 Drawing Sheets

VOTING DATA PREFETCH ENGINE

BACKGROUND OF THE INVENTION

1. Field of the Invention

The present invention relates generally to computer systems, and more particularly to data prefetching in computer systems.

2. Description of the Related Art

Computer systems typically include cache memories to reduce the cost of providing a processor with a high speed memory subsystem. A cache memory is a high-speed memory which acts as a buffer between the processor and main memory. Although smaller than the main memory, the cache memory is usually appreciably faster than the main memory. Memory subsystem performance can be increased by storing the most commonly used data (including instruction data) in smaller but faster cache memory (or cache memories). Because most programs exhibit temporal and spatial locality, past access patterns are reasonably predictive of future access patterns.

When the processor accesses a memory address, the cache memory determines if the data associated with the memory address is stored in the cache memory. If the data is stored in the cache memory, a cache hit results and the data is provided to the processor from the cache memory. If the data is not in the cache memory, a cache miss results and a lower level in the memory hierarchy must be accessed. A cache memory that maintains a cached set of memory locations approximating the set of most recently accessed memory locations is a historical cache memory.

Various techniques have been employed to improve cache performance, i.e., to reduce cache miss rates, over that provided by historical cache memory. One such technique is prefetching. Prefetching involves fetching (from lower levels in the memory hierarchy and into the cache memory) of data not yet accessed by the processor with the expectation that the processor will do so and will be better able to use the prefetched data than the data replaced to make room for the prefetched data. A cache memory which prefetches data is a predictive cache memory. By anticipating processor access patterns, prefetching helps to reduce cache miss rates. Prefetching is contrasted with fetch on demand implementations in which the cache fetches data as the data is requested by the processor.

The effectiveness of prefetching is limited to the ability of a particular prefetching method to predict addresses from which the processor will need to access data. Successful prefetching methods typically seek to take advantage of patterns in memory accesses by observing all, or a particular subset of, memory transactions and prefetching as yet unaccessed data for anticipated memory accesses. Memory transactions observed can include read and/or write accesses or cache miss transactions.

An example of a family of prefetching methods is the stream buffer predictor family. A stream buffer predictor generally uses hardware to observe memory transactions associated with cache misses and prefetches data (typically on a cache line basis) based on the observed pattern of cache misses. For example, while the missed cache line is fetched, the stream buffer predictor will prefetch data for the next sequential cache line or set of cache lines because memory is often accessed in address order. When a processor accesses data in the stream and there is a cache miss, the cache memory will first check the stream buffer before going to a lower level cache or main memory. A stream buffer predictor can be considered to be on the "back" side of the cache in the sense that it only observes cache accesses of a lower memory hierarchy device such as a main memory or a lower-level cache. An example of a stream buffer implementation is given in the U.S. Pat. No. 5,317,718, naming Norman P. Jouppi as inventor and entitled "Data Processing System and Method with Prefetch Buffers."

Another example of a family of prefetching methods is the load stride predictor family. A load stride predictor generally uses hardware to observe processor memory accesses to the cache and looks for patterns upon which to base predictions of addresses from which the processor will need data. For example, based on a memory read access by the processor and on a set of past memory accesses, a load stride predictor predicts the address(es) of additional data to be accessed by a current program sequence executing on the processor. Such a prediction triggers a prefetch of associated data, which is then available to satisfy a cache miss if the prediction was correct. A load stride predictor works well, for example, when making predictions based on differences between addresses while the processor is stepping through an array at fixed offsets from previous addresses. A load stride predictor is on the "front" side of the cache in the sense that it observes addresses provided to the cache from a processor, as opposed to merely observing cache miss related memory transactions. An example of a load stride type predictor implementation is given in the U.S. Pat. No. 5,377,336, naming Richard J. Eickemeyer as inventor and entitled "Improved Method to Prefetch Load Instruction Data."

A load stride predictor has an advantage over a stream buffer predictor since the memory transactions observed by a load stride predictor are not filtered by the cache. Nevertheless, the stream buffer predictor is often more robust than the load stride predictor under certain conditions where patterns in processor accesses are not discernible by the stride predictor. Typically, load stride predictors are designed to look only to load transactions whereas stream buffer predictors typically react to store-related, as well as load-related, cache misses.

SUMMARY OF THE INVENTION

It has been discovered that a voter provided in combination with a plurality of prefetch predictors provides improved prefetch performance. In one embodiment, the voter determines which of the prefetch predictors is making more accurate predictions, and uses predictions of the more accurate prefetch predictor to prefetch data into a buffer for use in satisfying cache misses. Such a voting prefetch engine advantageously improves cache performance, and therefore processor performance, by reducing cache misses more than cache misses would be reduced by operation of an individual prefetch predictor. A voting prefetch engine also advantageously reduces prefetch-related memory-to-cache traffic by throttling prefetch traffic of an ineffective prefetch address predictor.

In one embodiment in accordance with the present invention, an apparatus includes a prefetch buffer for a cache, first and second prefetch predictors, and a voter. The voter is coupled to select a prefetch address from one of the prefetch predictors based on prediction efficacies thereof and to prefetch data corresponding to the selected prefetch address into the prefetch buffer.

In a further embodiment, the prefetch buffer includes prediction source storage and use storage associated with prefetched data storage, and the voter is coupled to the prefetch buffer to receive a prediction efficacy feedback signal therefrom. The prediction efficacy feedback signal is a function of respective proportions of prefetched data used to service misses in the cache. In another further embodiment, the voter is selective between address predictions from the first and second prefetch predictors based on comparative prediction efficacies thereof. In yet another further embodiment, the voter is non-selective for prefetch address predictions from the first and second prefetch predictors based on a prediction efficacy threshold. In still yet another further embodiment, the voter is coupled to a memory hierarchy to supply a prefetch address selected from a more effective one of the prefetch predictors if the more effective one exceeds a prediction efficacy threshold. On the other hand, the voter is selective for a prefetch address from neither the first nor the second prefetch predictor if respective prediction efficacies do not exceed the prediction efficacy threshold.

In various alternative embodiments, the first prefetch predictor includes a stride predictor and the second prefetch predictor includes a stream predictor. In other alternative embodiments, both the first and the second prefetch predictor include stride predictors respectively implementing dissimilar stride prediction strategies.

In another embodiment in accordance with the present invention, an apparatus includes a first prefetch predictor, a second prefetch predictor, a prefetch buffer, and a voter. The first prefetch predictor is coupled to receive a memory address presented to a cache memory, and to predict based thereupon, a first prefetch address. The second prefetch predictor is coupled to receive a memory address supplied by the cache memory to a memory subsystem, and to predict based thereupon, a second prefetch address. The prefetch buffer is coupled between the cache memory and the memory subsystem to receive prefetched data from the memory subsystem and to provide the prefetched data to the cache if a correspondence exists between a cache miss memory addresses and the prefetched data. The voter is coupled to receive the first and the second prefetch addresses. The voter is responsive to prediction efficacy feedback, and in response thereto, is selective for one of the first and the second prefetch addresses for supply to the memory subsystem.

In a further embodiment, the prefetch buffer is coupled to supply the prediction efficacy feedback to the voter. In another further embodiment, the prefetch buffer includes a use indication associated with prefetched data storage. The voter is coupled to the prefetch buffer to receive the prediction efficacy feedback therefrom, and the prediction efficacy feedback is indicative of a proportion of the prefetched data storage used during a current prefetch interval to service misses in the cache memory. In yet another further embodiment, the first prefetch predictor is coupled to receive memory addressing information corresponding to read accesses to the cache memory. The second prefetch predictor is coupled to receive memory addressing information corresponding to read misses in the cache memory.

In still yet another further embodiment, the first prefetch predictor includes a stride predictor and the second prefetch predictor includes a stream predictor. When the stride predictor and the stream predictor predict non-overlapping first and second prefetch addresses, the voter selects the first prefetch addresses if the prediction efficacy feedback indicates that the stride predictor is more effective than the stream predictor and selects the second prefetch addresses if the prediction efficacy feedback indicates that the stream predictor is more effective than the stride predictor.

In yet another embodiment in accordance with the present invention, a method includes predicting a first prefetch address using a first prediction strategy, predicting a second prefetch address using a second prediction strategy, and selecting from among the first and the second prefetch addresses based on respective prediction efficacies for the first and the second prediction strategies.

Various additional embodiments further include prefetching, based on the selected one of the first and the second prefetch addresses, data into a prefetch buffer for use in satisfying cache misses, and satisfying cache misses using data from the prefetch buffer.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED
EMBODIMENT(S)

The following sets forth a detailed description of the preferred embodiments. The description is intended to be illustrative of the invention and should not be taken to be limiting. Many variations, modifications, additions, and improvements may fall within the scope of the invention as defined in the claims that follow.

Figure 1:
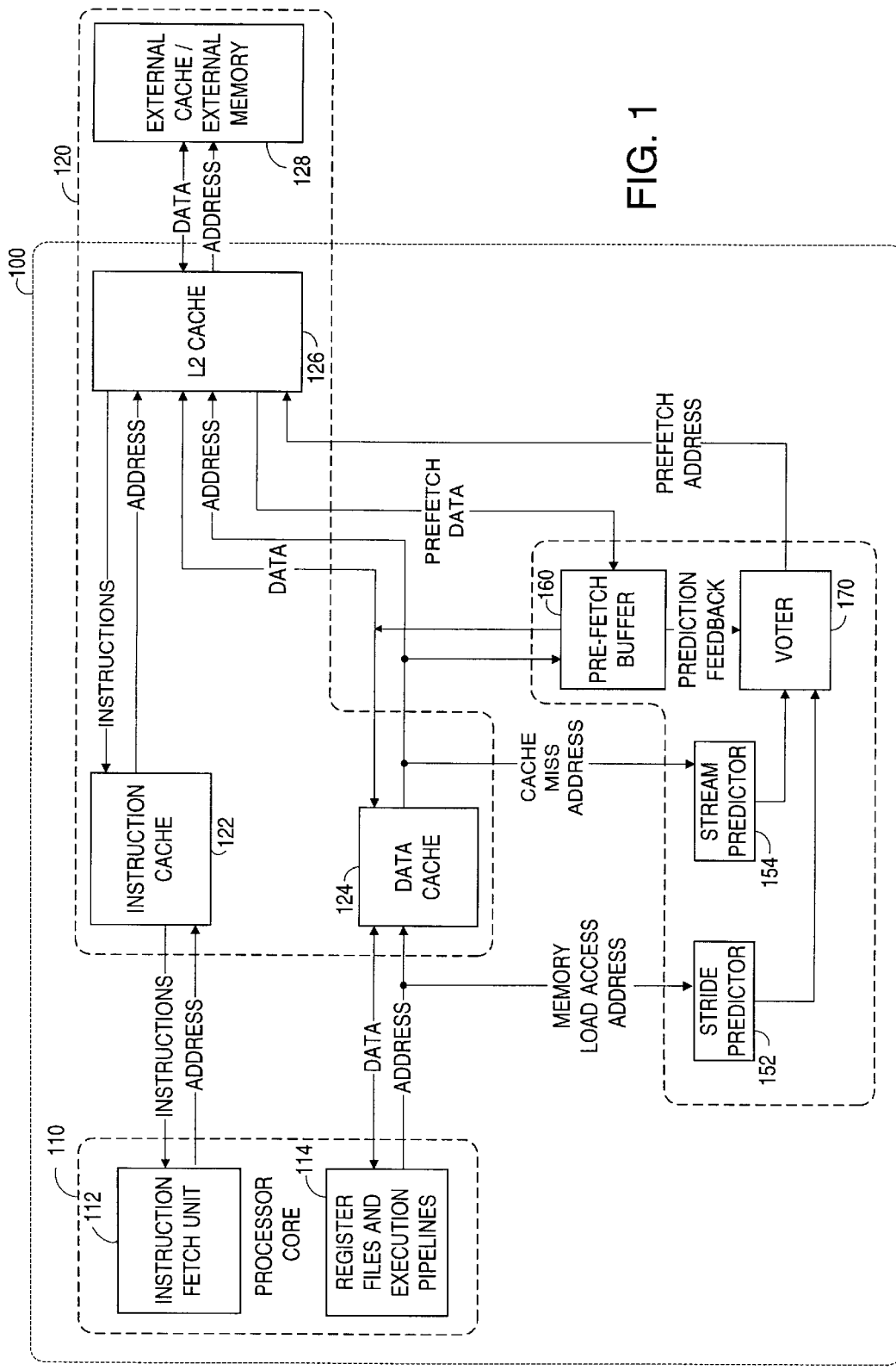
FIG. 1 is a block diagram depicting a processor including a voting prefetch feature in accordance with an exemplary embodiment of the present invention.

FIG. 1 depicts a processor 100 including a voting prefetch feature in accordance with an exemplary embodiment of the present invention. In one embodiment, processor 100 is a single chip processor and includes a processor core 110 which illustratively includes an instruction fetch unit 112 and execution pipelines 114 which load data from and store data to a memory hierarchy 120 defined by on- and off-chip portions. For example, in the exemplary embodiment of FIG. 1, memory hierarchy 120 is defined by instruction cache memory 122, data cache memory 124, a combined instruction/data second level cache memory 126, and external memory storage 128. Many alternative memory hierarchies are suitable, and based on the description herein, those of skill in the art will appreciate suitable modifications to the exemplary voting prefetch feature implementations. Instruction cache memory 122, data cache memory 124, and second level cache memory 126 are of any suitable design, including e.g., separate on-chip first-level caches and a unified off-chip second-level cache, on-chip first- and second-level caches and an external third-level cache, etc. In addition, the caches can be non-blocking, i.e., responsive to cache hits while processing outstanding cache misses, or blocking, and can be direct-mapped, fully-associative, set associative, etc.

A voting prefetch portion of processor 100 includes two prefetch address predictors, e.g., stride predictor 152 and stream predictor 154, a voter 170, and a prefetch buffer 160. Stride predictor 152 receives addresses corresponding to memory accesses by execution pipelines 114 of processor core 110 into memory hierarchy 120. In the exemplary embodiment of FIG. 1, stride predictor 152 receives addresses corresponding to read and write memory accesses. Frequently, such read and write memory accesses are serviced by data cache memory 124; however, if data cache memory 124 misses, i.e., if the corresponding data does not reside in data cache memory 124, the memory hierarchy 120 attempts to service the memory access using lower level storage such as second level cache memory 126, external memory storage 128, or, as described below, prefetch buffer 160. In one embodiment, stream predictor 154 receives addresses corresponding to read and write access cache misses.

Based on the addresses respectively received thereby, stride predictor 152 and stream predictor 154 each predict addresses for future memory accesses. Data corresponding to such predicted addresses are selectively prefetched from lower level storage, e.g., second level cache memory 126 or external memory storage 128, into prefetch buffer 160. Stride predictor 152 and stream predictor 154 compete to predict addresses for data to be prefetched into prefetch buffer 160. Voter 170 manages the competition between stride predictor 152 and stream predictor 154 based on prediction feedback received from prefetch buffer 160. Prediction feedback information allows voter 170 to prefer stride predictor 152 or stream predictor 154 based on the efficacy of each's predictions.

In one embodiment, stride predictor 152 and stream predictor 154 do not necessarily supply predicted addresses during each memory access cycle. For example, since stream predictor 154 predicts based on cache misses, stream predictor 154 may not have any useful predictions if data cache memory 124 has not recently missed. Also, even though the addresses received by stride predictor 152 are not filtered by cache hits in data cache memory 124, stride predictor 152 may either not detect a memory access pattern or may detect a pattern which for at least a reasonable number of iterations would be satisfied by the contents of data cache memory 124.

When neither stride predictor 152 nor stream predictor 154 supplies a predicted address, voter 170 has no prefetch address to supply. When only one of stride predictor 152 and stream predictor 154 supplies a predicted address, voter 170 typically supplies the predicted address. When both stride predictor 152 and stream predictor 154 supply predicted addresses, voter 170 selects one of the predicted addresses based on the prediction feedback information received from prefetch buffer 160. In this way, the prefetch predictor with the better prediction history is selected. In one embodiment, voter 170 selectively supplies predicted addresses to second level cache memory 126 when only one of stride predictor 152 and stream predictor 154 supplies a predicted address. For example, based on a poor prediction history, voter 170 may effectively disable the predictions of the ineffective prefetch predictor, favoring prefetched data residing in prefetch buffer 160 and corresponding to past predictions of the more effective prefetch predictor over current predictions of the less effective prefetch predictor.

As a program executing on processor core 110 generates memory accesses (and data cache memory 124 misses) stride predictor 152 and stream predictor 154 continue to individually generate predicted addresses. As data cache memory 124 misses are satisfied (or fail to be satisfied) by prefetched data in prefetch buffer 160, additional prediction history information for stride predictor 152 and/or stream predictor 154 is accumulated by voter 170. In response to the accumulated prediction history information, voter 170 selects predicted addresses of the more effective prefetch predictor when both stride predictor 152 and stream predictor 154 supply such information. If the prediction history information indicates that the particular prefetch predictor is ineffective, voter 170 may selectively disable supply of predicted addresses from either stride predictor 152 or stream predictor 154 to second level cache memory 126.

In one embodiment, an efficacy threshold is set by first examining entries in prefetch buffer 160 that have been used to service cache misses, and then determining if a majority of the useful predictions have been made by one of the predictors. To give both predictors a fair chance of being selected to generate future prefetch addresses, voter 170 goes into a periodic qualification phase. During this phase, stride predictor 152 and stream predictor 154 are used to predict prefetch addresses during respective prefetch evaluation intervals. In one embodiment, the respective prefetch evaluation intervals are individually contiguous and sequenced one after the other, although alternative prefetch evaluation interval definitions are also suitable. After a qualification phase, the more effective of stride predictor 152 and stream predictor 154 is selected for a next regular (non-evaluation) prefetch interval. The unselected predictor is re-evaluated during subsequent prefetch evaluation intervals and depending on the result of such evaluations, may be given another chance.

In one embodiment, prediction efficacy is tracked in prefetch buffer 160. Cache lines prefetched into prefetch buffer 160 include, in addition to a tag and a data section, two additional indications, which in some embodiments are encoded as two bits. The first of the two bits is a source (S) bit and is used to distinguish between the sources of prefetch addresses (e.g., encoding stride predictor 152 as the source with S=0 and encoding stream predictor 154 as the source with S=1). The second of the two bits is a use (U) bit and is set when a prefetched line is used to satisfy a miss in data cache memory 124. Alternative embodiments may exploit a variety of other suitable encodings, including encodings which orthogonally encode stride predictor 152 and stream predictor 154 source information.

In one embodiment, the S-bit is provided to second level cache memory 126 with the prefetch request, and is entered in prefetch buffer 160 upon return of the prefetched data. In one embodiment, prefetch buffer 160 is organized as a fully associative cache. In various alternative embodiments prefetch buffer 160 may be organized as a set associative cache, a direct mapped cache, etc. and may be independent of, or integrated with storage and tag resources provided by data cache memory 124.

In one embodiment, voter 170 selects either stride predictor 152 or stream predictor 154 during a startup period, supplying predicted addresses from the selected prefetch predictor to second level cache memory 126. In this way, data corresponding to the selected prefetch predictor's predicted addresses is prefetched into prefetch buffer 160. Prediction feedback from prefetch buffer 160 reflects the efficacy of the selected prefetch predictor in anticipating cache misses in data cache memory 124. After accumulating a prediction history for the selected prefetch predictor, voter 170 selects the other prefetch predictor and similarly accumulates a prediction history therefor. Then, based on prediction history for both stride predictor 152 and stream predictor 154, voter 170 selects between the two prefetch predictors as described above.

Both stride predictor 152 and stream predictor 154 should be periodically re-evaluated. In one embodiment, each is re-evaluated during periodic prefetch evaluation intervals. In a typical embodiment, regular (non-evaluation) prefetch intervals can include approximately 1 million instructions, while prefetch evaluation intervals include approximately 100,000 instructions. Alternative embodiments may suitably employ longer or shorter regular (non-evaluation) prefetch intervals and/or prefetch evaluation intervals. Those of skill in the art will recognize suitable intervals based on simulations of typical instruction streams or workloads.

Figure 2:
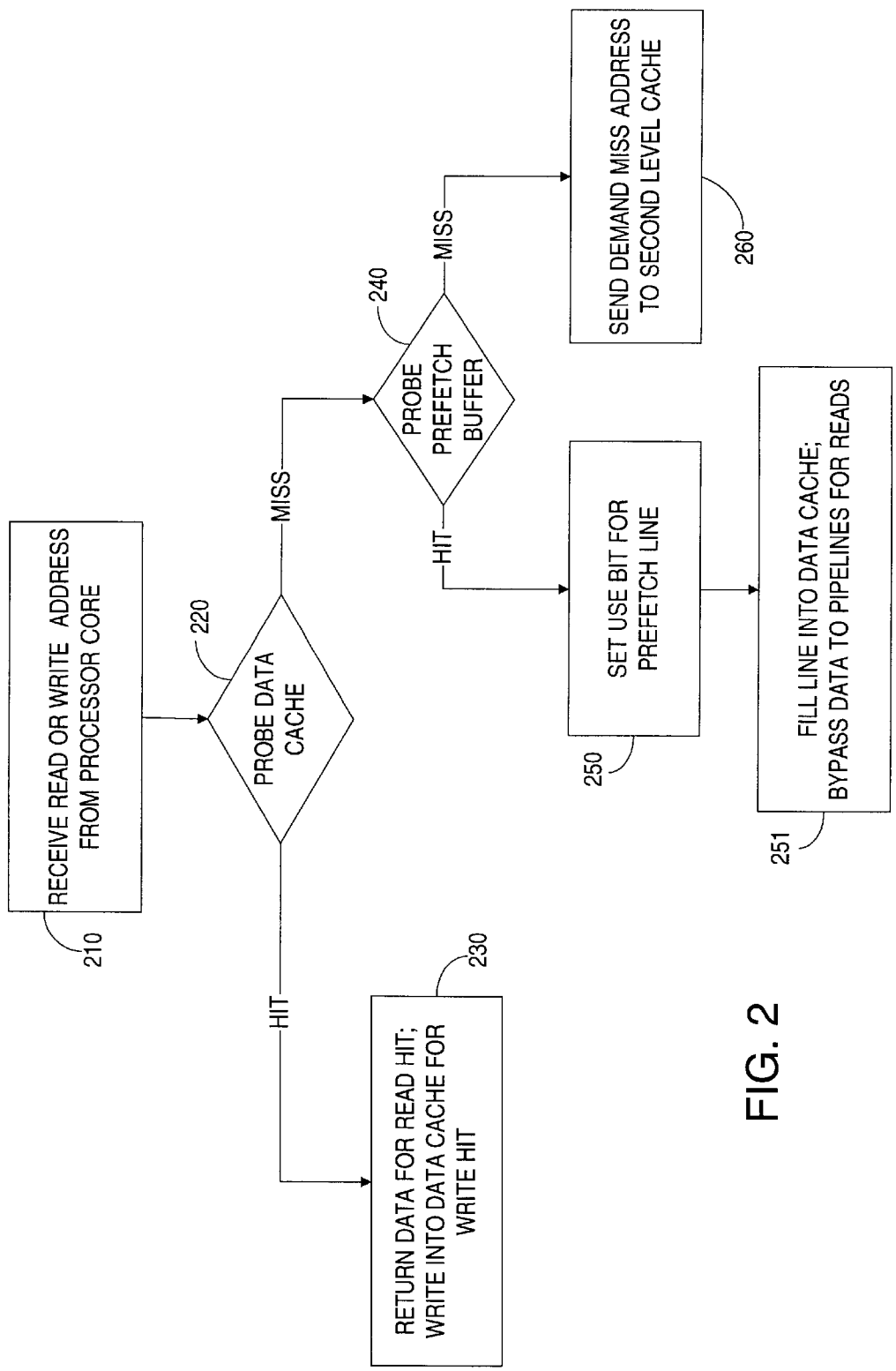
FIG. 2 is a flow chart depicting memory access operations of a data cache and prefetch buffer with support for voting among prefetch predictions in accordance with an exemplary embodiment of the present invention.

Read and write access servicing operations by prefetch buffer 160 are now described with reference to FIG. 2. During addressing operation 210, a read or write address is supplied by processor core 110 for probing 220 of data cache memory 124. If data cache probing 220 results in a cache hit, corresponding data is returned to processor core 110 from data cache memory 124 for a read access hit or corresponding data is written to data cache memory 124 for a write access hit (see cache hit handling 230). Data cache probing 220 is by tag lookup. If data cache probing 220 results in a cache miss, prefetch buffer probing 240 is performed. Like data cache probing 220, prefetch buffer probing 240 is by tag lookup. If the addressed data has been prefetched into prefetch buffer 160 as a result of a prediction by either stride predictor 152 or stream predictor 154, prefetch buffer probing 240 returns the associated data to data cache memory 124. In response to such a line hit, the use (U) bit associated with the hit line is set (see use indicating operation 250) in prefetch buffer 160. The hit line is filled into data cache memory 124 during prefetch line fill operation 251. In one embodiment, data from a hit line is bypassed to execution pipelines of processor core 110 for read accesses.

If addressed data has not been prefetched into prefetch buffer 124, i.e., if prefetch buffer probing 240 results in a miss, the demand miss address is sent to second level cache memory 126 for servicing during miss handling operation 260. Although the embodiment of prefetch buffer 160 shown in FIG. 1 is compatible with parallel lookup at both prefetch buffer 160 and second level cache memory 126, alternative embodiments may serialize lookup at prefetch buffer 160 and second level cache memory 126. Such a serialized probing process is shown by the flowchart of FIG. 2. Those of skill in the art will recognize suitable modifications for each.

Figure 3:
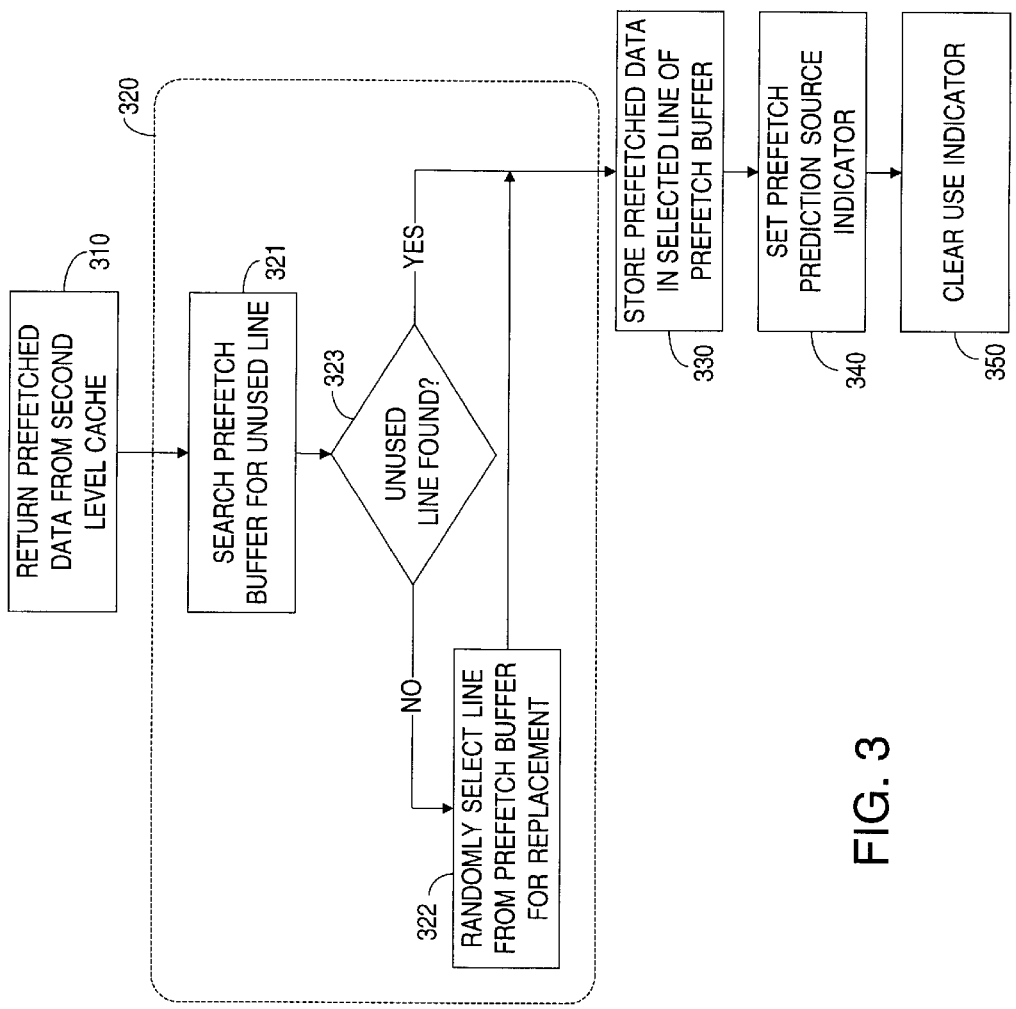
FIG. 3 is a flow chart depicting cache line fill operations of a data cache and prefetch buffer with support for voting among prefetch predictions in accordance with an exemplary embodiment of the present invention.

FIG. 3 depicts line fill operations of prefetch buffer 160 following miss handling operation 260. In response to the demand miss address supplied by data cache memory 124, second level cache memory 126 returns corresponding prefetched data in operation 310. Then, buffer line selection operations 320 identify a target line in prefetch buffer 160 into which the prefetched data can be stored. In the embodiment of FIG. 3, the target line is randomly selected in random line selection operation 322, although alternative embodiments may implement more sophisticated line replacement strategies, e.g., least recently used or approximations thereof. Once a target line has been selected in prefetch buffer 160, the prefetched data is stored (store operation 330) therein. A corresponding prefetch prediction source indicator, e.g., a source (S) bit, is set during source indicating operation 340 to indicate the particular prefetch address predictor, e.g., stride predictor 152 or stream predictor 154, responsible for the prefetched data. A use indication associated with the target line, e.g., a use (U) bit, is cleared during operation 350 to allow prediction efficacy tracking for the associated prefetch data and prefetch address predictor.

Figure 4:
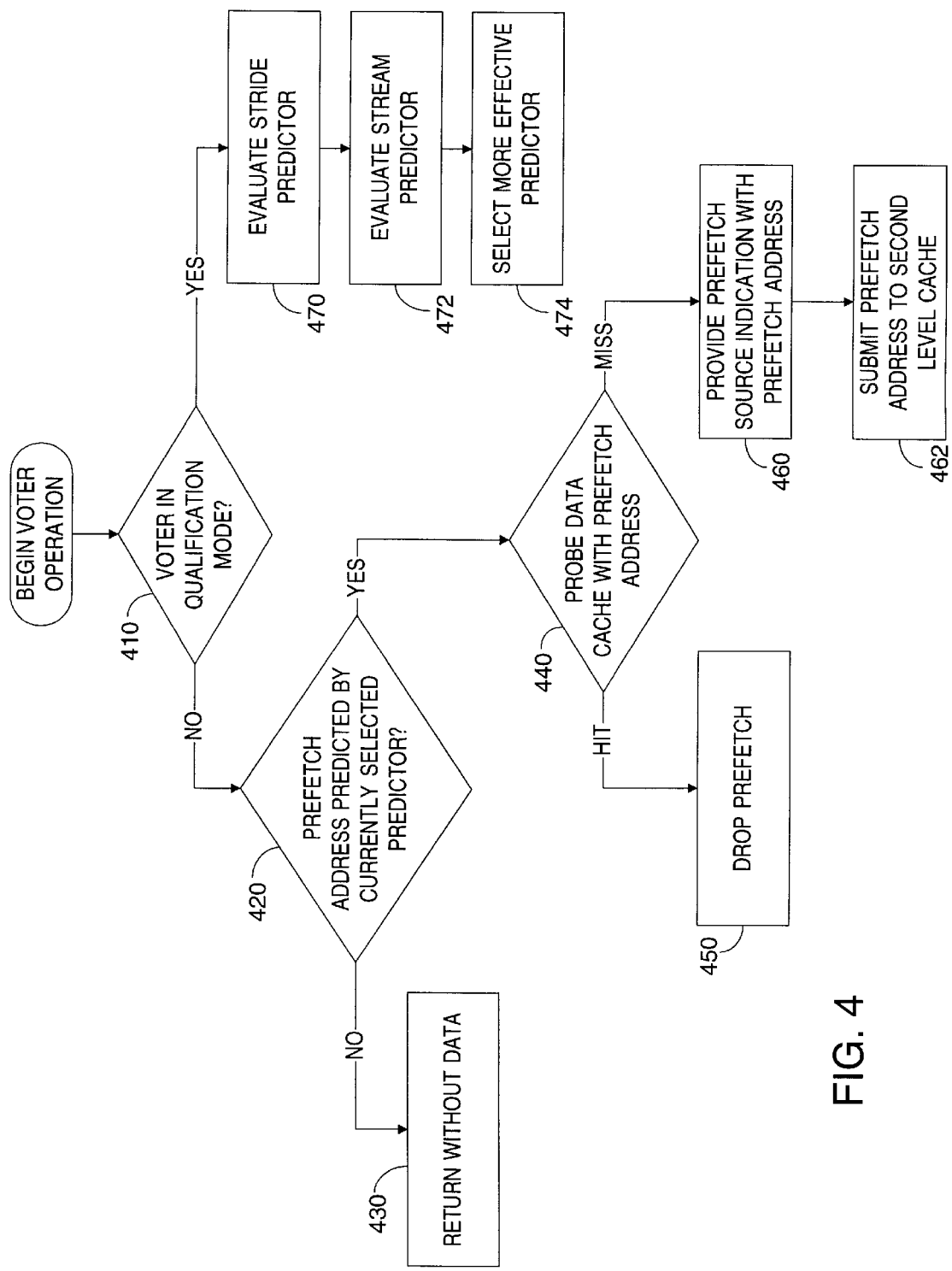
FIG. 4 is a flow chart depicting voter operations in accordance with an exemplary embodiment of the present invention.

FIG. 4 depicts voter operations in accordance with one embodiment of voter 170. In the embodiment illustrated, voter 170 operates in evaluation and non-evaluation modes and, as described above, periodically transitions between modes. If the current mode is non-evaluation mode, the prefetch address, if any, predicted by a currently selected predictor, e.g., stride predictor 152 or stream predictor 154, is used for probing 440 of data cache. If data associated with the prefetch address is already represented in data cache memory 124, the prefetch is dropped at operation 450 and voter 170 continues with the next prefetch address. If the prefetch address is not already represented in data cache memory 124, the prefetch address is submitted to second level cache memory 126. Prefetched data is returned from second level cache memory 126 to prefetch buffer 160 in operation 310 (see FIG. 3).

During evaluation mode, successive evaluation phases are completed and the more effective prefetch predictor is selected for non-evaluation mode operations. Stride predictor 152 is evaluated during evaluation phase 470 and stream predictor 154 is evaluated during evaluation phase 472. Evaluation phases 470 and 472 include operations analogous to those performed in non-evaluation mode, i.e., analogous to operations 420, 430, 440, 450, 460, and 462, but with stride predictor 152 or stream predictor 154 artificially selected to accumulated prediction efficacy information, rather than in response to prediction efficacy information. During evaluation mode, read and write access servicing operations by prefetch buffer 160 (see FIG. 2) and line fill operations of prefetch buffer 160 (see FIG. 3) continue as described above. In this way, prefetch prediction source and use indications are accumulated. Based on such source and use indications, the predictive efficacies of stride predictor 152 and stream predictor 154 are compared. The more effective predictor is selected for nonevaluation mode operations.

Those of skill in the art will appreciate a variety of additional embodiments based on the description herein. For example, voter operations in accordance with other embodiments of voter 170 may continuously accumulate prediction source and use indications without resort to periodic evaluation phases. In addition, selections of the more effective predictor may be made dynamically based on evolving source and use indication sets. Furthermore, and as described previously, alternative embodiments of voter 170 may supply a predicted address from a less effective of stride predictor 152 and stream predictor 154 if the more effective of the two makes no prefetch prediction and if the prediction efficacy of the less effective predictor at least exceeds an efficacy threshold. Suitable threshold values depend on available prefetch bandwidth, the size of prefetch buffer 160, etc. and may be selected based on simulation data.

While the invention has been described with reference to various embodiments, it will be understood that these embodiments are illustrative and that the scope of the invention is not limited to them. Many variations, modifications, additions, and improvements of the embodiments described are possible. For example, although processor core 110 has been described in the context of a pipelined multiple execution unit design, suitable processor cores include structures implementing any of a variety of processor architectures, including e.g., single- or multiple-execution unit processor cores; pipelined or non-pipelined processor cores; scalar, superscalar, vector, floating point, or integer processor cores; etc. Multi-chip processor implementations are also suitable.

Although the invention has been described with reference to exemplary stride and stream predictors respectively preceding and following a data cache, those of skill in the art will appreciate a variety of alternative configurations. For example, alternate families of predictors may be employed, including e.g., one block look-ahead predictors, more sophisticated stride predictors that predict pointer-linked list data structure access patterns, etc. In addition, predictors coupled to predict prefetch addresses each based on memory access addresses to data cache memory 124 or each based on cache miss addresses may be employed. More than two predictors may be employed with suitable modifications to voter 170. Voting prefetch features may be employed in the instruction fetch path or at lower levels in memory hierarchy 120, e.g., at second level cache memory 126.

Those skilled in the art will recognize that boundaries between logic blocks are merely illustrative and that alternative embodiments may merge logic blocks or impose an alternate decomposition of functionality for the prefetch engine. For example, prefetch buffer 160 may be combined with voter 170 to facilitate prefetch efficacy tracking. Furthermore, the particular prefetch mechanisms described herein are merely illustrative and a variety of additional and/or alternative techniques may be analogously provided in accordance with the present invention. Further, the present invention could be combined with software implementations of prefetch mechanisms. In particular, stride predictor implementations augmented by code provided in line with a program to facilitate memory access pattern detection are suitable. These and other variations, modifications, additions, and improvements may fall within the scope of the invention as defined in the claims which follow.

What is claimed is:

1. An apparatus comprising:
   a prefetch buffer for a cache;
   first and second prefetch predictors; and
   a voter coupled to select a prefetch address from one of the prefetch predictors based on prediction efficacies thereof and to prefetch data corresponding to the selected prefetch address into the prefetch buffer.

2. An apparatus, as recited in claim 1, wherein the prediction efficacy is indicated based on uses of prefetched data from the prefetch buffer to service misses in the cache.

3. An apparatus, as recited in claim 1,
   wherein the prefetch buffer includes prediction source storage and use storage associated with prefetched data storage; and
   wherein the voter is coupled to the prefetch buffer to receive a prediction efficacy feedback signal therefrom, the prediction efficacy feedback signal being a function of respective proportions of prefetched data used to service misses in the cache.

4. An apparatus, as recited in claim 1, wherein the voter is selective between address predictions from the first and the second prefetch predictors based on comparative prediction efficacies thereof.

5. An apparatus, as recited in claim 1, wherein the voter is non-selective for prefetch address predictions from the first and the second prefetch predictors based on a prediction efficacy threshold.

6. An apparatus, as recited in claim 1, wherein the voter is non-selective for prefetch address predictions from the first prefetch predictor based on a first prediction efficacy threshold and is non-selective for prefetch address predictions from the second prefetch predictor based on a second prediction efficacy threshold.

7. An apparatus, as recited in claim 1, wherein the voter is coupled to a memory hierarchy to supply a prefetch address selected from a more effective one of the prefetch predictors if the more effective one exceeds a prediction efficacy threshold, and wherein the voter is selective for a prefetch address from neither of the first and the second prefetch predictors if respective prediction efficacies do not exceed the prediction efficacy threshold.

8. An apparatus, as recited in claim 1, wherein the first prefetch predictor is a stride-type predictor.

9. An apparatus, as recited in claim 1, wherein the second prefetch predictor is a stream-type predictor.

10. An apparatus, as recited in claim 1, wherein the first prefetch predictor is coupled to receive read addresses directed to the cache.

11. An apparatus, as recited in claim 1, wherein the second prefetch predictor is coupled to receive cache miss addresses directed from the cache to lower levels in a memory hierarchy.

12. An apparatus, as recited in claim 1,
    wherein the first prefetch predictor is a load stride predictor coupled to receive read addresses directed to the cache; and
    wherein the second prefetch predictor is a stream predictor coupled to receive cache miss addresses directed from the cache to lower levels in a memory hierarchy.

13. An apparatus, as recited in claim 1, wherein the cache is a first-level data cache.

14. An apparatus, as recited in claim 1, wherein storage for the prefetch buffer is integrated with the cache.

15. An apparatus, as recited in claim 1, wherein the prefetch buffer is coupled between the cache and lower levels in a memory hierarchy.

16. An apparatus, as recited in claim 1, further comprising a third prefetch predictor and wherein the voter is selective among respective prefetch addresses from the first, the second, and the third prefetch predictors based on respective prediction efficacies thereof.

17. An apparatus, as recited in claim 1, wherein the prefetch buffer includes first and second portions for respectively storing prefetched data associated with the first and the second prefetch predictors.

18. An apparatus, as recited in claim 1, wherein the first prefetch predictor comprises a stride predictor predictive based at least partially on data states provided by software instructions included with executable code.

19. An apparatus, as recited in claim 1, wherein the first and the second prefetch predictors comprise stride predictors respectively implementing dissimilar stride prediction strategies.

20. An apparatus comprising:
    a first prefetch predictor coupled to receive a memory address presented to a cache memory, and to predict based thereupon, a first prefetch address;
    a second prefetch predictor coupled to receive a memory address supplied by the cache memory to a memory subsystem, and to predict based thereupon, a second prefetch address;
    a prefetch buffer coupled between the cache memory and the memory subsystem to receive prefetched data from the memory subsystem and to provide the prefetched data to the cache if a correspondence exists between a cache miss memory addresses and the prefetched data; and
    a voter coupled to receive the first and the second prefetch addresses, the voter being responsive to prediction efficacy feedback, and in response thereto, being selective for one of the first and the second prefetch addresses for supply to the memory subsystem.

21. An apparatus, as recited in claim 20, wherein the prefetch buffer is coupled to supply the prediction efficacy feedback to the voter.

22. An apparatus, as recited in claim 20, wherein the prefetch buffer includes prediction source storage and use storage associated with prefetched data storage; and wherein the voter is coupled to the prefetch buffer to receive the prediction efficacy feedback therefrom, the prediction efficacy feedback being a dynamic function of prediction source and prefetched data use statistics.

23. An apparatus, as recited in claim 22, wherein the prediction efficacy feedback is continuous function of prediction source and prefetched data use statistics.

24. An apparatus, as recited in claim 22, wherein the prediction efficacy feedback is a periodically updated function of prediction source and prefetched data use statistics.

25. An apparatus, as recited in claim 20, wherein the prefetch buffer includes a use indication associated with prefetched data storage; and wherein the voter is coupled to the prefetch buffer to receive the prediction efficacy feedback therefrom, the prediction efficacy feedback being indicative of a proportion of the prefetched data storage used during a current prefetch interval to service misses in the cache memory.

26. An apparatus, as recited in claim 20, wherein the prefetch buffer maintains use indications for prefetched data stored therein; and wherein the prediction efficacy feedback is indicative of a one of the first prefetch predictor and the second prefetch predictor having a proportionally greater number of use indications during comparable prediction efficacy evaluation intervals.

27. An apparatus, as recited in claim 20, wherein the first prefetch predictor is coupled to receive memory addressing information corresponding to read accesses to the cache memory; and wherein the second prefetch predictor is coupled to receive memory addressing information corresponding to read misses in the cache memory.

28. An apparatus, as recited in claim 20, wherein the first cache prefetch predictor is coupled to receive memory addressing information corresponding to write accesses to the cache memory; and wherein the second cache prefetch predictor is coupled to receive memory addressing information corresponding to write misses in the cache memory.

29. An apparatus, as recited in claim 20, wherein the second cache prefetch predictor is coupled to receive memory addressing information corresponding to read and write misses in the cache memory.

30. An apparatus, as recited in claim 20, wherein the first prefetch predictor comprises a stride predictor;

wherein the second prefetch predictor comprises a stream predictor; and wherein, when the stride predictor and the stream predictor predict non-overlapping first and second prefetch addresses, the voter selects the first prefetch addresses if the prediction efficacy feedback indicates that the stride predictor is more effective than the stream predictor and selects the second prefetch addresses if the prediction efficacy feedback indicates that the stream predictor is more effective than the stride predictor.

31. A method comprising:

predicting a first prefetch address using a first prediction strategy;

predicting a second prefetch address using a second prediction strategy; and selecting from among the first and the second prefetch addresses based on respective prediction efficacies for the first and the second prediction strategies.

32. A method, as recited in claim 31, further comprising:

selecting neither the first nor the second prefetch addresses if the respective prediction efficacies for the first and the second prediction strategies are both below a prediction efficacy threshold.

33. A method, as recited in claim 31, further comprising:

prefetching, based on the selected one of the first and the second prefetch addresses, data into a prefetch buffer for use in satisfying cache misses.

34. A method, as recited in claim 31, further comprising:

prefetching, based on the selected one of the first and the second prefetch addresses, data into a prefetch buffer; and satisfying cache misses using data from the prefetch buffer.

35. A method, as recited in claim 31, wherein the selecting from among the first and the second prefetch addresses is in accordance with:

periodic measuring of respective prediction efficacies for the first and the second prediction strategies; and periodic selecting, coincident with the periodic measuring, of a more effective of the first and the second prediction strategies.

36. A method, as recited in claim 31, wherein the selecting from among the first and the second prefetch addresses is dynamic with changing prediction efficacy measurements.

37. A method, as recited in claim 31, further comprising:

maintaining prediction source and prefetched data use information.

38. A method, as recited in claim 31, further comprising:

measuring predication efficacy for both the first and the second prediction strategies.

39. A method, as recited in claim 38, wherein the measuring is during periodic evaluation intervals.

40. A method, as recited in claim 38, wherein the measuring is continuous.

* * * * *